US011222225B2

United States Patent
DeLuca et al.

(10) Patent No.: US 11,222,225 B2
(45) Date of Patent: Jan. 11, 2022

(54) IMAGE RECOGNITION COMBINED WITH PERSONAL ASSISTANTS FOR ITEM RECOVERY

(71) Applicant: INTERNATIONAL BUSINESS MACHINES CORPORATION, Armonk, NY (US)

(72) Inventors: Lisa Seacat DeLuca, Baltimore, MD (US); Wei Zhang, Shanghai (CN)

(73) Assignee: International Business Machines Corporation, Armonk, NY (US)

(*) Notice: Subject to any disclaimer, the term of this patent is extended or adjusted under 35 U.S.C. 154(b) by 147 days.

(21) Appl. No.: 16/203,937

(22) Filed: Nov. 29, 2018

(65) Prior Publication Data

US 2020/0175302 A1 Jun. 4, 2020

(51) Int. Cl.
*G06K 9/32* (2006.01)
*G06K 9/46* (2006.01)
*G06T 1/00* (2006.01)
*G06Q 10/06* (2012.01)
*G06Q 20/20* (2012.01)
*G06K 9/20* (2006.01)

(52) U.S. Cl.
CPC ............ *G06K 9/3241* (2013.01); *G06K 9/46* (2013.01); *G06Q 10/06313* (2013.01); *G06Q 20/203* (2013.01); *G06T 1/0007* (2013.01); *G06K 2009/2045* (2013.01)

(58) Field of Classification Search
CPC .............. G06Q 10/087; G06Q 50/28; G06Q 10/06315; G06Q 30/0635; G06Q 20/203
See application file for complete search history.

(56) References Cited

U.S. PATENT DOCUMENTS

| 8,212,668 | B2 | 7/2012 | Gabara | |
| 9,132,957 | B1* | 9/2015 | Girdhar | G06Q 10/087 |
| 9,171,278 | B1* | 10/2015 | Kong | G06Q 10/087 |
| 9,786,145 | B2* | 10/2017 | Oppenheimer | G06K 7/10009 |
| 9,875,427 | B2* | 1/2018 | Medasani | G06T 7/74 |
| 10,043,069 | B1* | 8/2018 | Liu | G06K 9/2072 |
| 10,133,738 | B2* | 11/2018 | Huang | G06F 40/58 |
| 10,223,732 | B2* | 3/2019 | Short | G06Q 10/02 |
| 10,318,576 | B2* | 6/2019 | Jaber | G06F 16/5854 |
| 10,610,787 | B2* | 4/2020 | Hamilton, II | G06F 16/90344 |

(Continued)

OTHER PUBLICATIONS

Mell et al., "The NIST Definition of Cloud Computing", Recommendations of the National Institute of Standards and Technology, NIST Special Publication 800-145, Sep. 2011, 7 pages.

*Primary Examiner* — Peter Ludwig
(74) *Attorney, Agent, or Firm* — L. Jeffrey Kelly

(57) ABSTRACT

According to one embodiment, a method, computer system, and computer program product for using a virtual assistant and electronic devices to find lost objects is provided. The present invention may include identifying one or more candidate items corresponding with one or more user-identified lost items within captured images such as real-time or archived camera feeds within the area where the item was lost; identifying secondary items with a spatial relationship to the candidate items; communicating, to a user, location information associated with the one or more candidate items by reference to the secondary items based on the identifying.

18 Claims, 6 Drawing Sheets

(56) References Cited

U.S. PATENT DOCUMENTS

| | | | |
|---|---|---|---|
| 2008/0077511 A1* | 3/2008 | Zimmerman | G06Q 10/00 705/28 |
| 2009/0121017 A1* | 5/2009 | Cato | G06Q 10/087 235/385 |
| 2012/0166241 A1* | 6/2012 | Livingston | G06Q 10/0631 705/7.12 |
| 2014/0193087 A1* | 7/2014 | Conwell | G06K 9/6253 382/224 |
| 2014/0327518 A1* | 11/2014 | Loutit | G05B 19/00 340/7.58 |
| 2015/0084745 A1* | 3/2015 | Hertz | H04W 4/024 340/10.3 |
| 2015/0278980 A1* | 10/2015 | Sinclair | G06T 1/0064 382/100 |
| 2015/0356345 A1* | 12/2015 | Velozo | G06K 9/00228 382/103 |
| 2016/0055451 A1* | 2/2016 | Waters | G01S 19/01 340/8.1 |
| 2016/0110793 A1* | 4/2016 | Herring | G06Q 20/208 705/26.64 |
| 2016/0373570 A1* | 12/2016 | Scavezze | H04W 4/025 |
| 2017/0142549 A1 | 5/2017 | Herbert et al. | |
| 2017/0178227 A1* | 6/2017 | Graham | G06Q 10/087 |
| 2017/0286773 A1* | 10/2017 | Skaff | G06K 9/46 |
| 2017/0351940 A1* | 12/2017 | Mazzarella | G06K 9/00979 |
| 2017/0374266 A1 | 12/2017 | Butts et al. | |
| 2018/0025310 A1* | 1/2018 | Gabbai | G06Q 10/087 705/28 |
| 2018/0075403 A1* | 3/2018 | Mascorro Medina | G06Q 10/087 |
| 2018/0227393 A1* | 8/2018 | Daub | H04L 67/22 |
| 2018/0300043 A1* | 10/2018 | Graham | G06Q 50/28 |
| 2019/0020992 A1* | 1/2019 | Romano | H04M 11/045 |
| 2019/0043003 A1* | 2/2019 | Fisher | G06K 9/00335 |
| 2019/0147393 A1* | 5/2019 | McCafferty | G06Q 30/0208 340/572.1 |
| 2019/0163698 A1* | 5/2019 | Kwon | G06K 9/6212 |
| 2019/0236530 A1* | 8/2019 | Cantrell | G06Q 20/203 |
| 2020/0151692 A1* | 5/2020 | Gao | G06Q 20/201 |

* cited by examiner

IMAGE RECOGNITION COMBINED WITH PERSONAL ASSISTANTS FOR ITEM RECOVERY

BACKGROUND

The present invention relates, generally, to the field of computing, and more particularly to digital object recognition.

Digital object recognition is the field concerned with utilizing computers to extract meaningful information from digital images, a task that, while easy for humans, is extraordinarily difficult for computers. Extracting meaningful information from an image may entail transforming the visual images into descriptions of the world that can interface with other cognitive processes such to produce appropriate reactions. This image understanding can be seen as the disentangling of symbolic information from image data using models constructed with the aid of geometry, statistics, and learning theory. While many approaches to the task have been implemented over the past few decades, there remains a long way to go before digital image recognition begins to approach the speed and accuracy of a human being.

SUMMARY

According to one embodiment, a method, computer system, and computer program product for using a virtual assistant and electronic devices to find lost objects is provided. The present invention may include identifying one or more candidate items corresponding with one or more user-identified lost items within captured images such as real-time or archived camera feeds within the area where the item was lost; identifying secondary items with a spatial relationship to the candidate items; communicating, to a user, location information associated with the one or more candidate items by reference to the secondary items based on the identifying.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
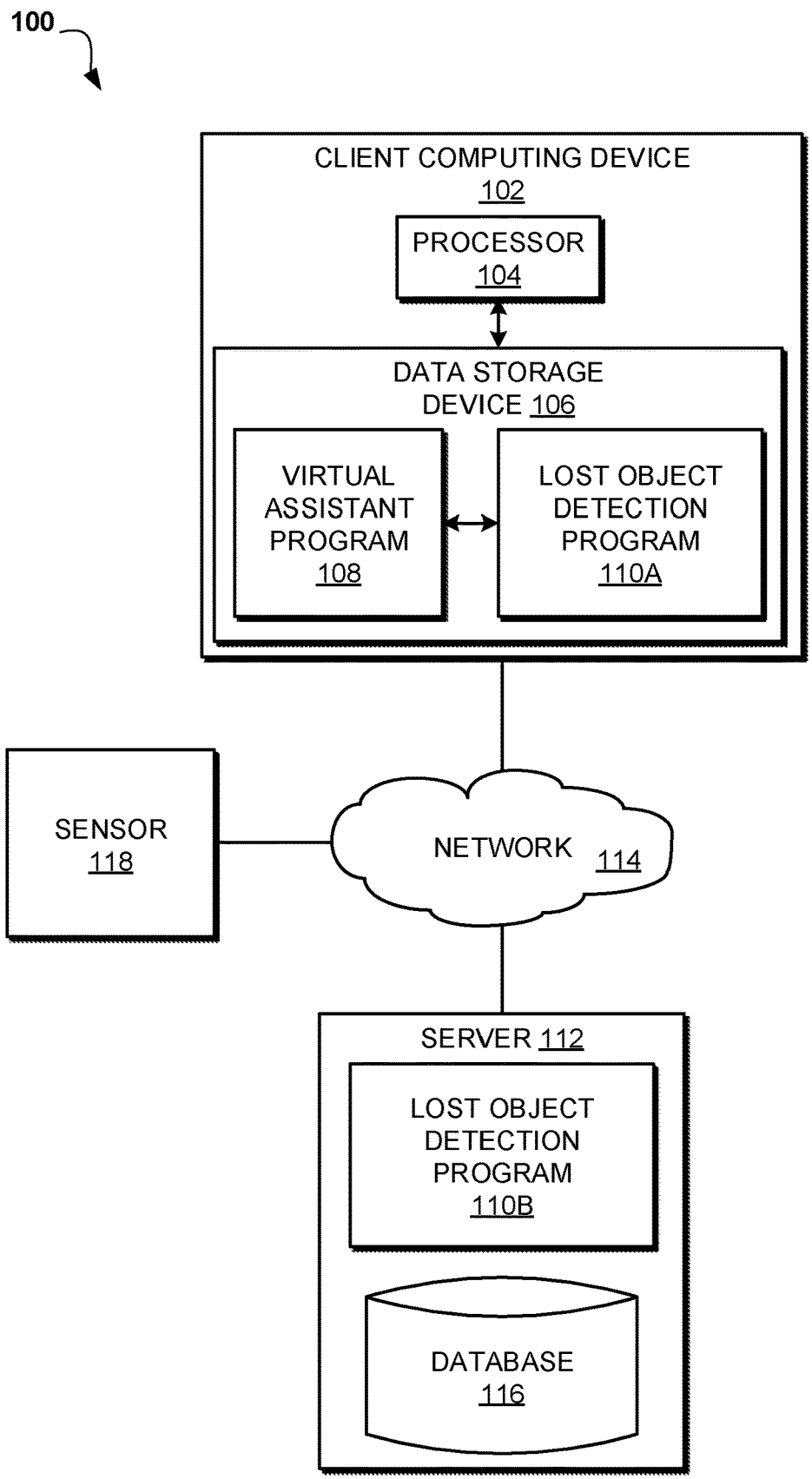
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to digital object recognition. The following described exemplary embodiments provide a system, method, and program product to, among other things, locate missing objects within captured images and direct the user to the location of the lost object. Therefore, the present embodiment has the capacity to improve the technical field of digital object recognition by allowing users to quickly and efficiently interact with the system to automatically identify lost objects.

As previously described, digital object recognition is the field concerned with utilizing computers to extract meaningful information from digital images, a task that, while easy for humans, is extraordinarily difficult for computers. Extracting meaningful information from an image may entail transforming the visual images into descriptions of the world that can interface with other cognitive processes such to produce appropriate reactions. This image understanding can be seen as the disentangling of symbolic information from image data using models constructed with the aid of geometry, statistics, and learning theory. While many approaches to the task have been implemented over the past few decades, there remains a long way to go before digital image recognition begins to approach the speed and accuracy of a human being.

People are always losing things. There have been a number of innovations developed in order to help a user locate lost items, such as keyring locators based on Bluetooth, and even larger GPS tracking devices. However, these solutions require tracking devices be attached to any given object that might be lost. To put a tracker on only objects a person expects to lose would be expensive, bulky and unreasonable, let alone on all objects that might need to be found. What is needed is a way to leverage image recognition solutions to locate lost objects. There may further be a need to integrate such a solution with a virtual assistant in order to facilitate quick and efficient interfacing between the system and the user. As such, it may be advantageous to, among other things, implement a system that leverages digital image recognition technology alongside a virtual assistant program to enable users to quickly and easily locate lost objects.

According to one embodiment, the invention may be a method of utilizing user prompts to identify lost items within captured images, and directing the user to the lost object, or the region where the lost object was last identified. The invention may operate within an environment comprising one or more cameras within one or more rooms, where the cameras are available through a shared network; the invention, in this embodiment, may further be equipped with a virtual assistant.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to locate missing objects within captured images and direct the user to the location of the lost object.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a virtual assistant 108 and a lost object detection program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 4, the client computing device 102 may include internal components 402a and external components 404a, respectively.

The server computer 112 may be a laptop computer, netbook computer, personal computer (PC), a desktop computer, or any programmable electronic device or any network of programmable electronic devices capable of hosting and running a lost object detection program 110B and a database 116 and communicating with the client computing device 102 via the communication network 114, in accordance with embodiments of the invention. As will be discussed with reference to FIG. 4, the server computer 112 may include internal components 402b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

Sensor 118 may be any sensor installed within a location where lost items might be searched for that provide information on that environment. Sensor 118 may be, for instance, an optical or infrared camera, a microphone, a motion sensor, et cetera. Sensor 118 may be in communication with network 114 and accessible to virtual assistant 108 and/or lost object detection program 110A, 110B.

According to the present embodiment, virtual assistant 108 may be one of any number of software agents capable of interacting with a user by means of text or audible speech and providing information or performing tasks based on the voice or text input of the user. Examples may include recent commercially successful voice-based virtual assistants such as the Google Home® (Google Home® and all Google Home®-based trademarks and logos are trademarks or registered trademarks of Google Inc. and/or its affiliates), the Amazon Echo® (Amazon Echo® and all Amazon Echo®-based trademarks and logos are trademarks or registered trademarks of Amazon Technologies, Inc. and/or its affiliates), and Ski® (Ski® and all Siri®-based trademarks and logos are trademarks or registered trademarks of Apple Inc. and/or its affiliates). Virtual assistant program 108 need not necessarily be located on client computing device 102; virtual assistant program 108 may be located anywhere within communication of the lost object detection program 110A, 110B, such as on server 112 or on any other device located within network 114. Furthermore, virtual assistant program 108 may be distributed in its operation over multiple devices, such as client computing device 102 and server 112.

According to the present embodiment, the lost object detection program 110A, 110B may be a program capable of locate missing objects within captured images and direct the user to the location of the lost object. The lost object detection method is explained in further detail below with respect to FIG. 2. The lost object detection program 110A, 110B may be a discrete program or it may be a subroutine or method integrated into virtual assistant program 108. The lost object detection program 110A, 110B may be located on client computing device 102 or server 112 or on any other device located within network 114. Furthermore, lost object detection program 110A, 110B may be distributed in its operation over multiple devices, such as client computing device 102 and server 112.

Figure 2:
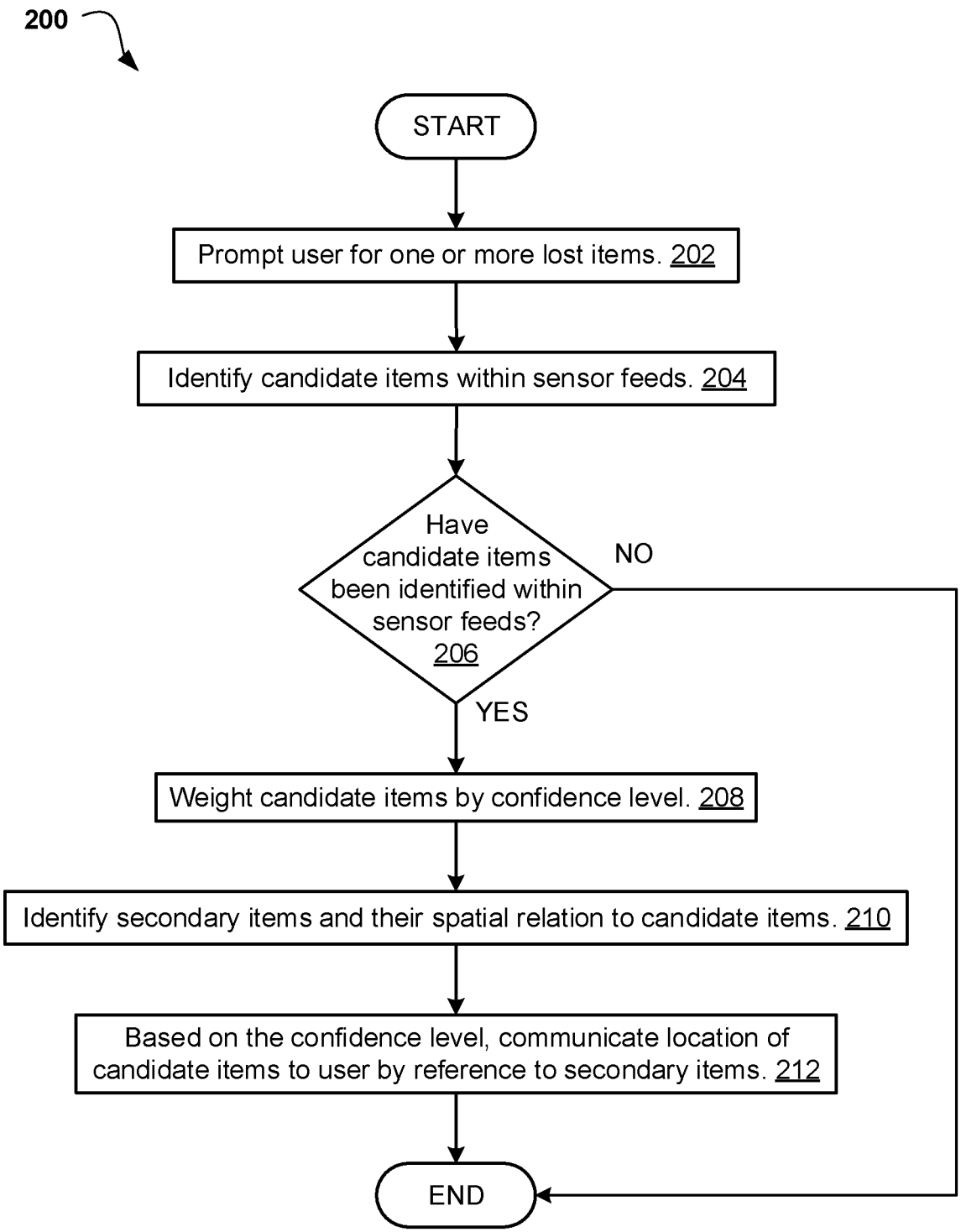
FIG. 2 is an operational flowchart illustrating a lost object detection process according to at least one embodiment.

Referring now to FIG. 2, an operational flowchart illustrating a lost object detection process 200 is depicted according to at least one embodiment. At 202, the lost object detection program 110A, 110B prompts the user for one or more lost items. The lost object detection program 110A, 110B may prompt the user in response to one or more voice or text commands given by the user. The lost object detection program 110A, 110B may prompt the user by asking for the name of the object that is lost; in some embodiments, where the name of the lost object is insufficient information to identify candidate items that might be the lost object, lost object detection program 110A, 110B may prompt for additional information, such as the last seen location of the lost object, physical properties of the lost object such as color or size, likely places the lost object could be, et cetera. In some embodiments, lost object detection program 110A, 110B may prompt the user to expose an object that is similar to the lost object to a sensor. For instance, suppose the lost object is a tennis ball; lost object detection program 110A, 110B may prompt the user to show a similar object to the system. In response, the user may hold another tennis ball up in front of a camera.

At 204, lost object detection program 110A, 110B identifies candidate items within sensor feeds. The lost object detection program 110A, 110B may identify candidate items by utilizing any of a number of image recognition techniques. In some embodiments, the lost object detection program 110A, 110B may begin by searching real-time or near-real time camera feeds, and if lost object detection program 110A, 110B does not identify any candidate items, lost object detection program 110A, 110B may begin searching archived footage from the sensors. The lost object detection program 110A, 110B may search archived footage from most recent to oldest; lost object detection program 110A, 110B may also cease searching archived footage captured before a certain predetermined date in order to improve search times. The lost object detection program 110A, 110B may use information provided by the user in order to direct the breadth of the search, for instance where the user specifies a room where the item was last seen, lost object detection program 110A, 110B may first search footage from sensors in the specified room before moving on to footage from other rooms.

The lost object detection program 110A, 110B may also utilize the past location of the user (or any other individual) to direct the search, as it is far more likely for a lost item to be located along the route of a user. Location data may be received from a user's mobile device, for instance a tablet or cell phone which is often carried on the person of the user, or may be inferred from sensor data. For instance, image recognition may confirm the presence of the user in a room at a given time, as may motion detectors, infrared cameras, sound sensors, et cetera. The lost object detection program 110A, 110B may identify an object as a candidate object if it matches the lost object. In some embodiments, a perfect match may be required; in other embodiments, lost object detection program 110A, 110B may identify an object as a candidate object if it exceeds a threshold similarity to the lost item. This threshold similarity may be provided by a user and/or may be automatically set and adjusted based on past successes and failures.

In some embodiments of the invention, lost object detection program 110A, 110B may first search for candidate items in sensor feeds from locations where the lost item is more likely to have been lost; for instance, if the lost item is a food item, it is more likely to be in the dining room or kitchen, and thus sensors in those two locations ought to be prioritized first. For another example, a lost item of clothing may be more likely to be found in the laundry room or bedroom. The lost object detection program 110A, 110B may make these logical connections automatically based on the location of particular lost items in past instances where a lost object was correctly identified, or it may be provided a list of logical connections by a user or another program or service.

At 206, the lost object detection program 110A, 110B determines whether candidate items have been identified within the sensor feeds. In some embodiments, lost object detection program 110A, 110B may simply store the number of candidate items, and merely check to see if that number is greater than zero. According to one implementation, if the lost object detection program 110A, 110B determines that candidate items have been identified within the real time sensor feeds, (step 206, "YES" branch), the lost object detection program 110A, 110B may continue to step 208 to weight the candidate items by confidence level. If the lost object detection program 110A, 110B determines that no candidate items have been identified within the real time sensor feeds (step 206, "NO" branch), the lost object detection program 110A, 110B may terminate.

At step 208, lost object detection program 110A, 110B may weight candidate items by confidence level. In the event that there are multiple candidate items, lost object detection program 110A, 110B may assign a confidence score to each candidate item, where the confidence score represents a likelihood that the candidate item is the lost item. This confidence score may take into account multiple factors, such as whether the location of the candidate item corresponded with a previous location of the user or another user, the extent to which the candidate item matches a description offered by the user or a similar item presented to the system by the user, which candidate item was seen most recently, whether the candidate item was present in sensor data prior to the time when the user identified it as missing, et cetera. The confidence score may also consider the visibility of the candidate item to the system; for instance, if a candidate item is partially occluded, poorly lit, far from the sensor, or otherwise difficult to obtain a clear image of, the confidence score may be adversely affected as a result. In some embodiments of the invention, the score may be affected by stored data regarding past instances of successful or unsuccessful lost item identification attempts, or by user feedback.

At step 210, lost object detection program 110A, 110B may identify secondary items and their spatial relationship to candidate items. The lost object detection program 110A, 110B may, for each candidate item, locate at least one secondary item near the candidate item, and identify the spatial relationship between the two items, where the spatial relationship may include the relative position (above, to the left, to the side, underneath), distance, et cetera. For instance, if the user is looking for a red comb, and lost object detection program 110A, 110B identifies what might be a red comb which is sitting on a dresser between two black combs, lost object detection program 110A, 110B may identify the dresser and both black combs as secondary items. In another example, a red shoe may be resting in a laundry basket; lost object detection program 110A, 110B may identify the laundry basket as a secondary item. The amount of secondary items identified may be adjusted automatically or by a user based on a desired level of precision in describing the location of the candidate object. The lost object detection program 110A, 110B may identify fewer secondary items if the user desires faster speed in identifying objects. The lost object detection program 110A, 110B may also prioritize different objects to be identified as secondary items based on a number of criteria, including proximity to the candidate item, size or recognizability of the object, et cetera. For instance, lost object detection program 110A, 110B may be more familiar with certain objects or may be quicker or more efficient at identifying certain objects, and may therefore prioritize identifying those objects as secondary items if they are reasonably near to the candidate item.

At step 212, lost object detection program 110A, 110B may communicate the location of candidate items to the user by reference to secondary items. The lost object detection program 110A, 110B may communicate the location of candidate items via virtual assistant 108, such as via audible speech, text, or image, or may communicate with the user directly. The lost object detection program 110A, 110B may communicate the location of the candidate items by reference to the general location of the candidate item, such as the room that the item is in, which may be made known to lost object detection program 110A, 110B by the location or name of the sensor which captured the image of the candidate item. For instance, if the candidate item was found in an image taken by the camera labeled 'kitchen,' the lost object detection program 110A, 110B may say to the user "the lost object is in the kitchen." Furthermore, the lost object detection program 110A, 110B may further refine the communicated location of the candidate item by describing the location of the candidate item with reference to any corresponding secondary items; for instance, in the example of the red comb on a dresser between two combs in a bedroom, lost object detection program 110A, 110B may say to the user "check the dresser in the bedroom, between the two black combs." The lost object detection program 110A, 110B may also further refine the location information by associating regions of the camera feed with a location, which could be as granular as associating individual pixel regions with coordinates or as broad as associating a large pixel region within the camera images with, for example, the far side of the bedroom. In the event of multiple candidate items, lost object detection program 110A, 110B may only communicate the location of the candidate object that has the highest confidence score. The lost object detection program 110A, 110B may also communicate the location of all candidate items, or only candidate items with confidence scores that exceed a threshold set by a user or by machine learning. The lost object detection program 110A, 110B may also communicate the confidence score to the user, or may indicate its uncertainty in situations where the confidence score is below the threshold, for instance by saying "the lost object might be in the living room," or "there is a 42% chance that the item is in the laundry basket."

Figure 3:
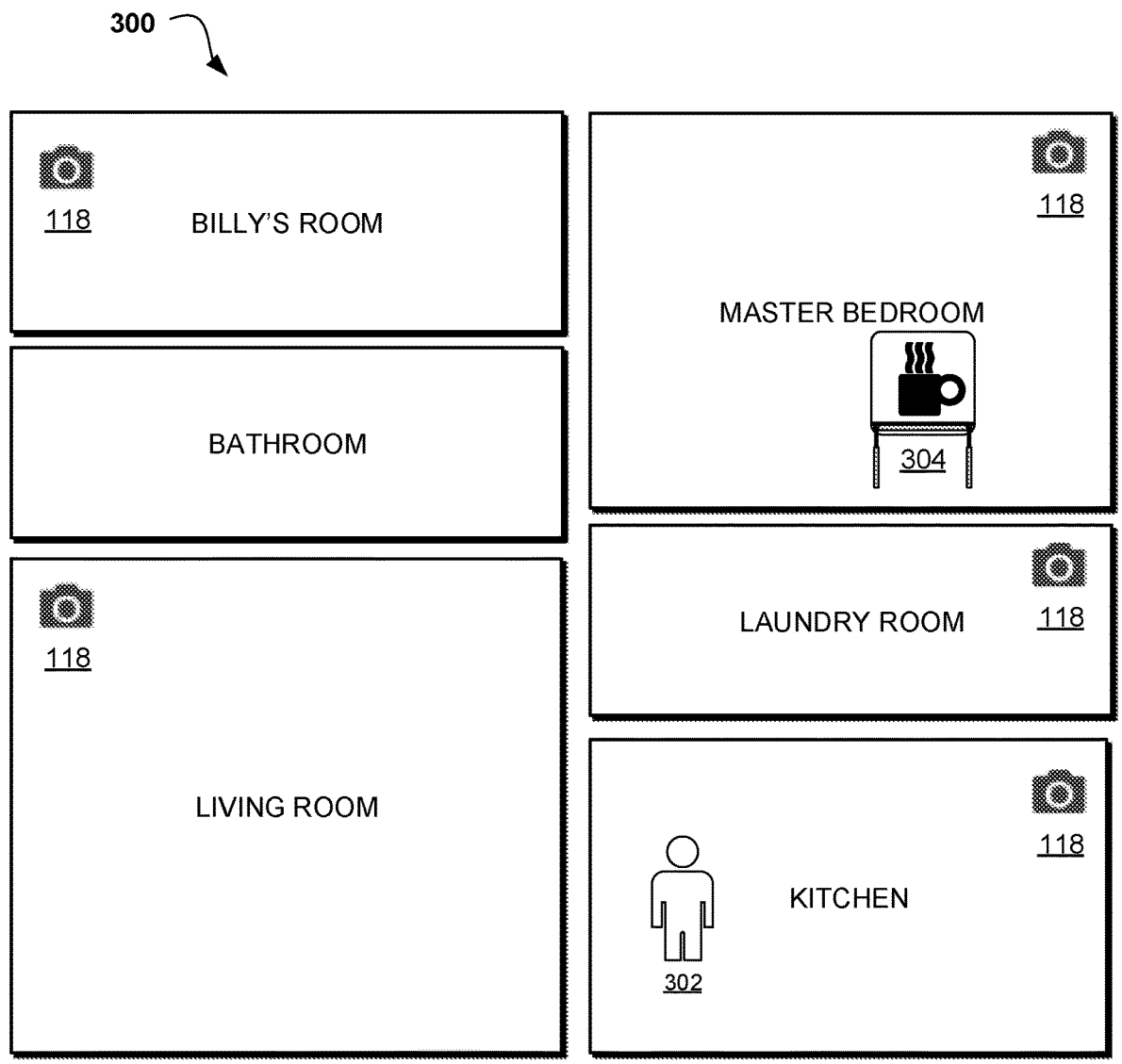
FIG. 3 is an exemplary technical architecture for the implementation of a lost object detection process according to at least one embodiment.

FIG. 3 is an exemplary technical architecture for the implementation of a lost object detection process according to at least one embodiment; in this embodiment, an exemplary environment 300 is depicted wherein a system implementing a lost object detection process 200 has been deployed, comprising a series of rooms some of which are equipped with sensors 118. In this embodiment, the sensors may be cameras. An exemplary interaction with the invention may proceed as follows:

User 302 is attempting to get ready for in the morning, but he cannot find his red coffee mug anywhere. He asks his virtual assistant "Computer, where is my red coffee mug?" The system taps into camera feeds for each of the sensors 118 within the house. After processing the images within the sensor feeds using image recognition, the system identifies what looks to be a red coffee mug 304 on a table in the master bedroom. The visual recognition software was able to identify the table as well as the coffee mug 304 and their relationships as far as relative location between those two items. The personal agent responds: "check the table in the master bedroom." User 302 runs to the laundry room, finds his mug, and the user leaves for work.

It may be appreciated that FIGS. 2-3 provide only an illustration of possible implementations and does not imply any limitations with regard to how different embodiments may be implemented. Many modifications to the depicted environments may be made based on design and implementation requirements. For instance, in some embodiments lost object detection program 110A, 110B may prompt the user for feedback after communicating the location of the candidate item, and storing the feedback and relevant details of the interaction for use in future interactions. In some embodiments, lost object detection program 110A, 110B may utilize GPS trackers or other microlocation devices to locate lost items, or as secondary items.

Figure 4:
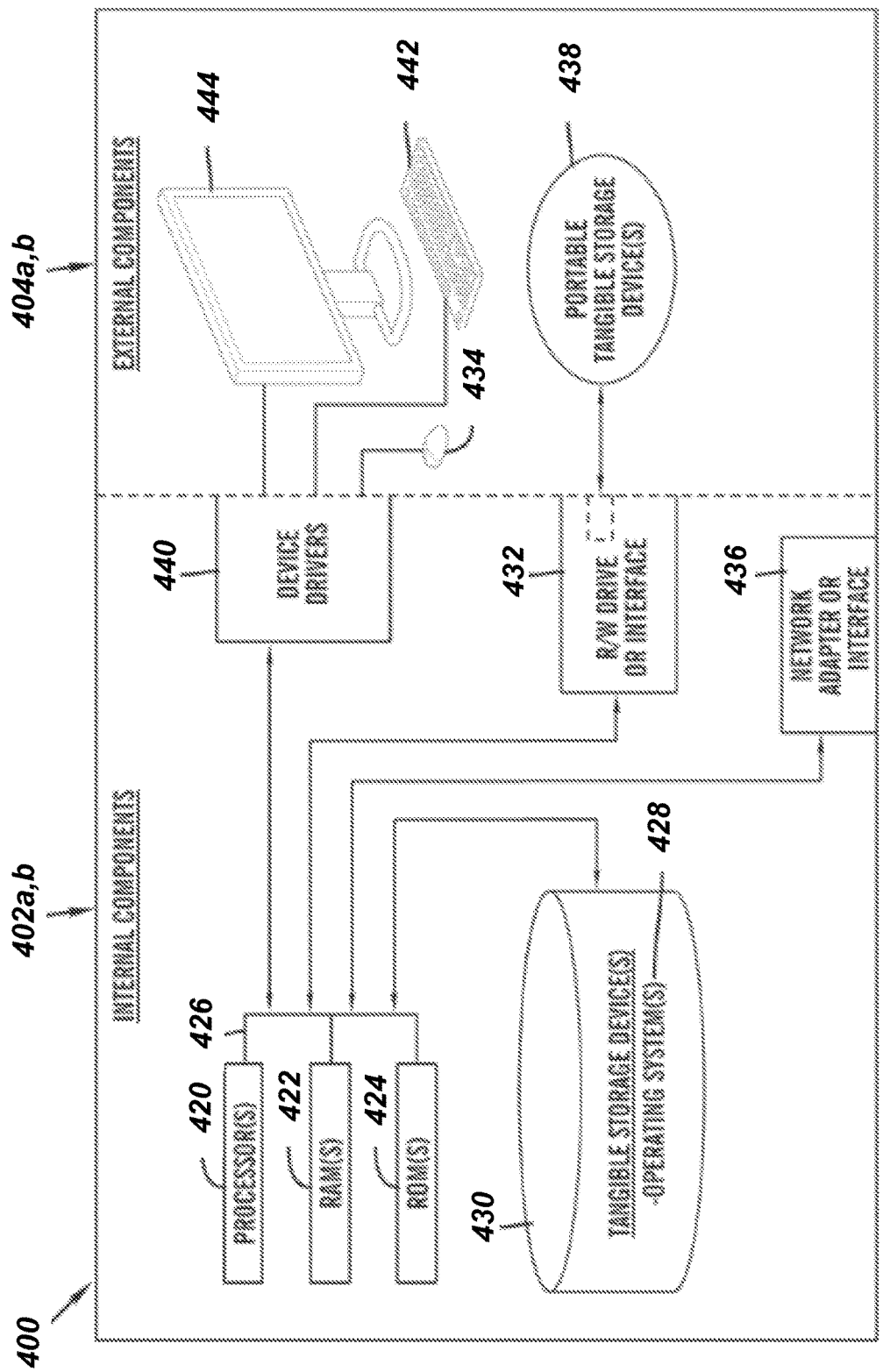
FIG. 4 is a block diagram of internal and external components of computers and servers depicted in FIG. 1 according to at least one embodiment.

FIG. 4 is a block diagram 400 of internal and external components of the client computing device 102 and the server 112 depicted in FIG. 1 in accordance with an embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 402 a,b and external components 404 a,b illustrated in FIG. 4. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the virtual assistant 108 and the lost object detection program 110A in the client computing device 102, and the lost object detection program 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402 a,b also includes a R/W drive or interface 432 to read from and write to one or more portable computer-readable tangible storage devices 438 such as a CD-ROM, DVD, memory stick, magnetic tape, magnetic disk, optical disk or semiconductor storage device. A software program, such as the lost object detection program 110A, 110B, can be stored on one or more of the respective portable computer-readable tangible storage devices 438, read via the respective R/W drive or interface 432, and loaded into the respective hard drive 430.

Each set of internal components 402 a,b also includes network adapters or interfaces 436 such as a TCP/IP adapter cards, wireless Wi-Fi interface cards, or 3G or 4G wireless interface cards or other wired or wireless communication links. The virtual assistant 108 and the lost object detection program 110A in the client computing device 102 and the lost object detection program 110B in the server 112 can be downloaded to the client computing device 102 and the server 112 from an external computer via a network (for example, the Internet, a local area network or other, wide area network) and respective network adapters or interfaces 436. From the network adapters or interfaces 436, the virtual assistant 108 and the lost object detection program 110A in the client computing device 102 and the lost object detection program 110B in the server 112 are loaded into the respective hard drive 430. The network may comprise copper wires, optical fibers, wireless transmission, routers, firewalls, switches, gateway computers and/or edge servers.

Each of the sets of external components 404 a,b can include a computer display monitor 444, a keyboard 442, and a computer mouse 434. External components 404 a,b can also include touch screens, virtual keyboards, touch pads, pointing devices, and other human interface devices. Each of the sets of internal components 402 a,b also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
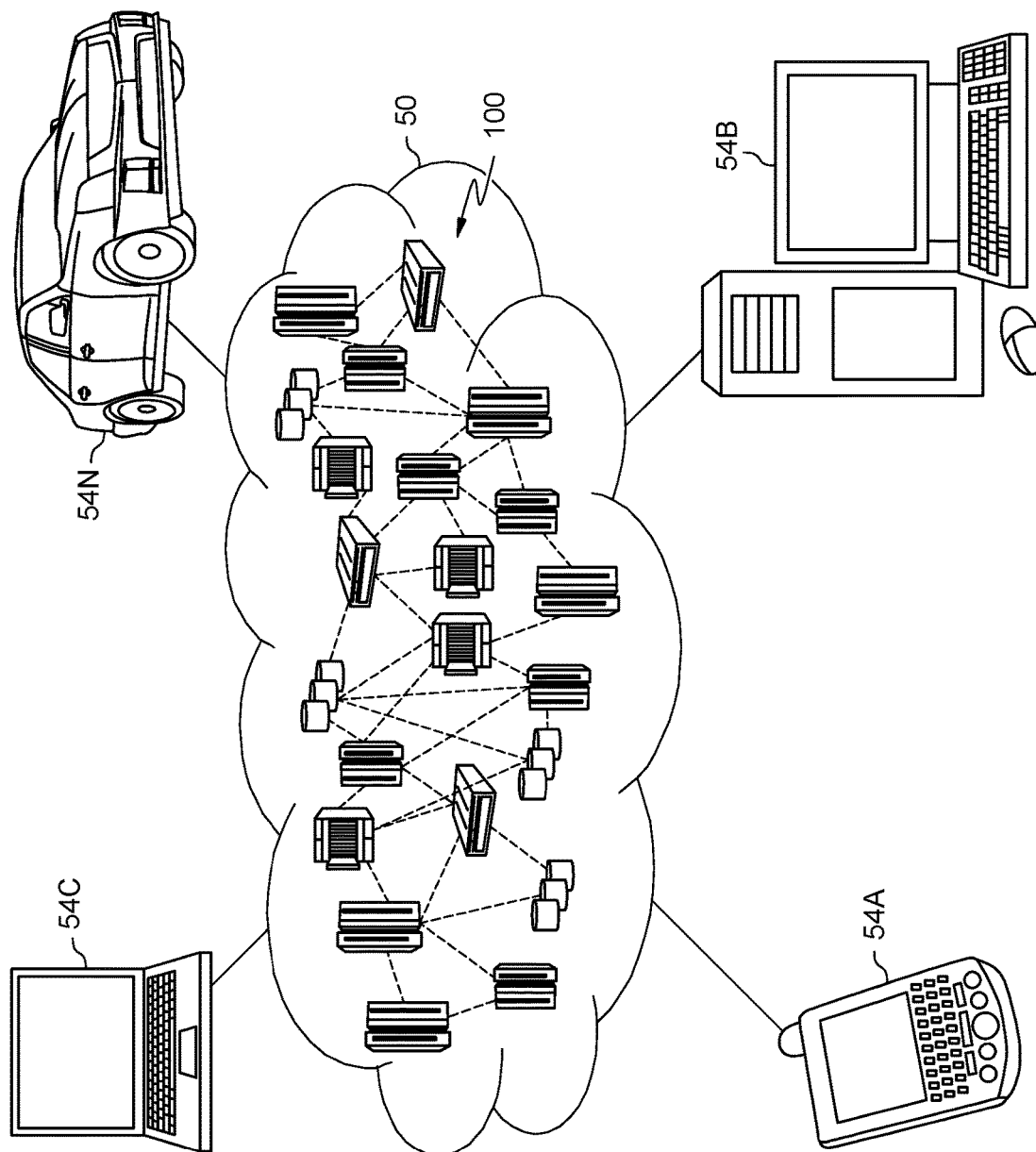
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
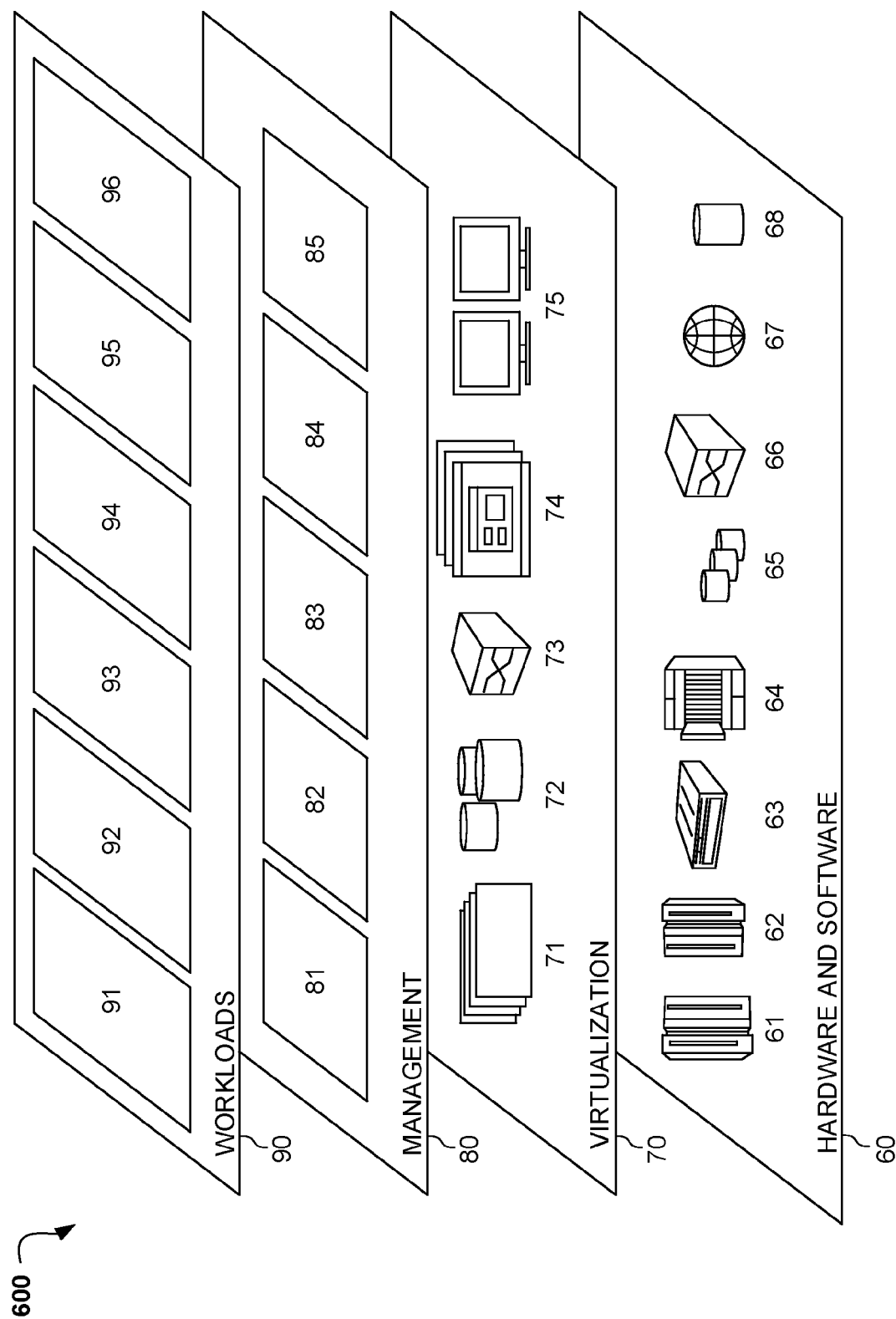
FIG. 6 depicts abstraction model layers according to an embodiment of the present invention.

Referring now to FIG. 6, a set of functional abstraction layers 600 provided by cloud computing environment 50 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and lost object detection 96. The lost object detection 96 may relate to locate missing objects within captured images and direct the user to the location of the lost object.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for utilizing electronic devices to identify a lost item, the method comprising:
   in response to a voice command by a user, prompting the user for a last known location of the lost item, a possible location of the lost item, physical properties of the lost item, and prompting the user to expose a similar object to a sensor;
   identifying one or more candidate items corresponding with user provided physical properties of the lost item, the last known location, the possible location and sensor input of the similar object, within one or more captured images using digital object recognition technology for comparison to physical properties of each of the one or more candidate items;
      as each of the one or more candidate items are identified, while continuing to identify additional one or more candidate items, in response to identifying each of the one or more candidate items, concurrently determining a confidence score to each of the one or more candidate identified items based on:
      a correspondence of a previous location of the lost item and a current location of each of the one or more candidate items, a correspondence of a previous location of a user and the current location of each of the one or more candidate items, a comparison of a description of the lost item compared to a description of each of the one or more candidate items, a visibility of each of the one or more candidate items, stored data regarding past instances of identification attempts of the lost item, user feedback regarding the lost item, and user feedback regarding the one or more candidate items;
   upon a determination that each of the one or more candidate items do not exceed a confidence score threshold, identifying one or more second candidate items corresponding with user provided physical properties of the lost item within one or more archived captured images using digital object recognition technology for comparison to physical properties of each of the one or more second candidate items;
      as each of the one or more second candidate items are identified, while continuing to identify additional one or more second candidate items, in response to identifying each of the one or more second candidate items, concurrently determining a confidence score to each of the one or more second candidate identified items based on:
      a correspondence of a previous location of the lost item and a current location of each of the one or more second candidate items, a correspondence of a previous location of the user and the current location of each of the one or more second candidate items, a comparison of a description of the lost item compared to a description of each of the one or more second candidate items, a visibility of each of the one or more second candidate items, stored data regarding past instances of identification attempts of the lost item, the user feedback regarding the lost item, and user feedback regarding the one or more second candidate items;
   communicating, to the user, the one or more second candidate items and their corresponding confidence score which exceeds the confidence score threshold; and
   communicating, to the user, archive location information associated with each of the one or more second candidate items.

2. The method of claim 1, further comprising:
   identifying at least one secondary item associated with a first candidate item of the one or more second candidate items.

3. The method of claim 2, wherein communicating the location information associated with each of the one or more second candidate items is conducted by reference to the corresponding one or more secondary items.

4. The method of claim 1, wherein identifying is performed on the one or more captured images captured by one or more sensors in one or more locations corresponding with location data associated with the user.

5. The method of claim 1, wherein the one or more second candidate items are captured in a reference image by one or more sensors.

6. The method of claim 1, wherein communicating the location information is performed by a virtual assistant.

7. A computer system for utilizing electronic devices to identify a lost item, the computer system comprising:
   one or more processors, one or more computer-readable memories, one or more network-enabled sensors, one or more computer-readable non-transitory storage medium, and program instructions stored on at least one of the one or more non-transitory storage medium for execution by at least one of the one or more processors via at least one of the one or more memories, wherein the computer system is capable of performing a method comprising:
in response to a voice command by a user, prompting the user for a last known location of the lost item, a possible location of the lost item, physical properties of the lost item, and prompting the user to expose a similar object to a sensor;
identifying one or more candidate items corresponding with user provided physical properties of the lost item, the last known location, the possible location and sensor input of the similar object, within one or more captured images using digital object recognition technology for comparison to physical properties of each of the one or more candidate items;
  as each of the one or more candidate items are identified, while continuing to identify additional one or more candidate items, in response to identifying each of the one or more candidate items, concurrently determining a confidence score to each of the one or more candidate items based on:
  a correspondence of a previous location of the lost item and a current location of each of the one or more candidate items, a correspondence of a previous location of a user and the current location of each of the one or more candidate items, a comparison of a description of the lost item compared to a description of each of the one or more candidate items, a visibility of each of the one or more candidate items, stored data regarding past instances of identification attempts of the lost item, user feedback regarding the lost item, and user feedback regarding the one or more candidate items;
upon a determination that each of the one or more candidate items do not exceed a confidence score threshold, identifying one or more second candidate items corresponding with user provided physical properties of the lost item within one or more archived captured images using digital object recognition technology for comparison to physical properties of each of the one or more second candidate items;
  as each of the one or more second candidate items are identified, while continuing to identify additional one or more second candidate items, in response to identifying each of the one or more second candidate items, concurrently determining a confidence score to each of the one or more second candidate identified items based on:
  a correspondence of a previous location of the lost item and a current location of each of the one or more second candidate items, a correspondence of a previous location of the user and the current location of each of the one or more second candidate items, a comparison of a description of the lost item compared to a description of each of the one or more second candidate items, a visibility of each of the one or more second candidate items, stored data regarding past instances of identification attempts of the lost item, the user feedback regarding the lost item, and user feedback regarding the one or more second candidate items;
communicating, to the user, the one or more second candidate items and their corresponding confidence score which exceeds the confidence score threshold; and
communicating, to the user, archive location information associated with each of the one or more second candidate items.

8. The computer system of claim 7, further comprising:
identifying at least one secondary item associated with a first candidate item of the one or more second candidate items.

9. The computer system of claim 8, wherein the communicating the location information associated with each of the one or more second candidate items is conducted by reference to the corresponding one or more secondary items.

10. The computer system of claim 7, wherein the identifying is performed on the one ore more images captured by one or more sensors in one or more locations corresponding with location data associated with the user.

11. The computer system of claim 7, wherein the one or more second candidate items are captured in a reference image by one or more sensors.

12. The computer system of claim 7, wherein communicating the location information is performed by a virtual assistant.

13. A computer program product for utilizing electronic devices to identify a lost item, the computer program product comprising:
one or more computer-readable non-transitory storage medium and program instructions stored on at least one of the one or more non-transitory storage medium, the program instructions executable by a processor to cause the processor to perform a method comprising:
in response to a voice command by a user, prompting the user for a last known location of the lost item, a possible location of the lost item, physical properties of the lost item, and prompting the user to expose a similar object to a sensor;
identifying one or more candidate items corresponding with user provided physical properties of the lost item, the last known location, the possible location and sensor input of the similar object, within one or more captured images using digital object recognition technology for comparison to physical properties of each of the one or more candidate items;
  as each of the one or more candidate items are identified, while continuing to identify additional one or more candidate items, in response to identifying each of the one or more candidate items, concurrently determining a confidence score to each of the one or more identified candidate items based on:
  a correspondence of a previous location of the lost item and a current location of each of the one or more candidate items, a correspondence of a previous location of a user and the current location of each of the one or more candidate items, a comparison of a description of the lost item compared to a description of each of the one or more candidate items, a visibility of each of the one or more candidate items, stored data regarding past instances of identification attempts of the lost item, user feedback regarding the lost item, and user feedback regarding the one or more candidate items;
upon a determination that each of the one or more candidate items do not exceed a confidence score threshold, identifying one or more second candidate items corresponding with user provided physical properties of the lost item within one or more archived captured images using digital object recognition technology for comparison to physical properties of each of the one or more second candidate items;
  as each of the one or more second candidate items are identified, while continuing to identify additional one or more second candidate items, in response to identifying each of the one or more second candidate items, concurrently determining a confidence score to each of the one or more second candidate identified items based on:
- a correspondence of a previous location of the lost item and a current location of each of the one or more second candidate items, a correspondence of a previous location of the user and the current location of each of the one or more second candidate items, a comparison of a description of the lost item compared to a description of each of the one or more second candidate items, a visibility of each of the one or more second candidate items, stored data regarding past instances of identification attempts of the lost item, the user feedback regarding the lost item, and user feedback regarding the one or more second candidate items;

communicating, to the user, the one or more second candidate items and their corresponding confidence score which exceeds the confidence score threshold; and communicating, to the user, archive location information associated with each of the one or more second candidate items.

14. The computer program product of claim 13, further comprising:
identifying at least one secondary item associated with a first candidate item of the one or more second candidate items.

15. The computer program product of claim 14, wherein the communicating the location information associated each of with the one or more second candidate items is conducted by reference to the corresponding one or more secondary items.

16. The computer program product of claim 13, wherein the identifying is performed on the one or more captured images captured by one or more sensors in one or more locations corresponding with location data associated with the user.

17. The computer program product of claim 13, wherein the one or more second candidate items are captured in a reference image by one or more sensors.

18. The computer program product of claim 13, wherein communicating the location information is performed by a virtual assistant.

* * * * *